United States Patent
Nachimuthu et al.

(10) Patent No.: US 9,378,133 B2
(45) Date of Patent: Jun. 28, 2016

(54) AUTONOMOUS INITIALIZATION OF NON-VOLATILE RANDOM ACCESS MEMORY IN A COMPUTER SYSTEM

(75) Inventors: Murugasamy K. Nachimuthu, Beaverton, OR (US); Mohan Kumar, Aloha, OR (US); Dimitrios Ziakas, Hillsboro, OR (US)

(73) Assignee: Intel Corporation, Santa Clara, CA (US)

( * ) Notice: Subject to any disclaimer, the term of this patent is extended or adjusted under 35 U.S.C. 154(b) by 62 days.

(21) Appl. No.: 13/997,945

(22) PCT Filed: Sep. 30, 2011

(86) PCT No.: PCT/US2011/054407
§ 371 (c)(1),
(2), (4) Date: Jun. 25, 2013

(87) PCT Pub. No.: WO2013/048485
PCT Pub. Date: Apr. 4, 2013

(65) Prior Publication Data
US 2013/0304980 A1    Nov. 14, 2013

(51) Int. Cl.
*G06F 12/02* (2006.01)
*G06F 9/44* (2006.01)

(52) U.S. Cl.
CPC .......... *G06F 12/0246* (2013.01); *G06F 9/4403* (2013.01)

(58) Field of Classification Search
CPC .................... G06F 12/0246; G06F 2212/2024; G06F 9/4403; G06F 2212/202; G06F 9/4401; G06F 12/0238; G06F 12/00
See application file for complete search history.

(56) References Cited

U.S. PATENT DOCUMENTS

| 5,097,118 A | 3/1992 | Iijima |
| 5,230,052 A | 7/1993 | Dayan et al. |

(Continued)

FOREIGN PATENT DOCUMENTS

| CN | 1101442 A | 4/1995 |
| CN | 1682199 A | 10/2005 |

(Continued)

OTHER PUBLICATIONS

Lee et al., "Architecting Phase Change Memory as a Scalable DRAM Alternative", ISCA '09, Jun. 20, 2009, 12 pgs., Austin, Texas, USA.

(Continued)

*Primary Examiner* — Hashem Farrokh
(74) *Attorney, Agent, or Firm* — Blakely, Sokoloff, Taylor & Zafman LLP

(57) ABSTRACT

A non-volatile random access memory (NVRAM) is used in a computer system to store information that allows the NVRAM to autonomously initialize itself at power-on. The computer system includes a processor, an NVRAM controller coupled to the processor, and an NVRAM that comprises the NVRAM controller. The NVRAM is byte-rewritable and byte-erasable by the processor. The NVRAM stores a memory interface table containing information for the NVRAM controller to autonomously initialize the NVRAM upon power-on of the computer system without interacting with the processor and firmware outside of the NVRAM. The information is provided by the NVRAM controller to the processor to allow the processor to access the NVRAM.

21 Claims, 4 Drawing Sheets

(56) References Cited

U.S. PATENT DOCUMENTS

| | | | |
|---|---|---|---|
| 5,511,202 | A | 4/1996 | Combs et al. |
| 5,535,357 | A | 7/1996 | Moran et al. |
| 5,544,356 | A * | 8/1996 | Robinson et al. ............ 707/821 |
| 5,822,581 | A | 10/1998 | Christeson |
| 5,905,993 | A | 5/1999 | Shinohara |
| 5,912,839 | A | 6/1999 | Ovshinsky et al. |
| 6,018,806 | A * | 1/2000 | Cortopassi et al. .......... 714/6.31 |
| 6,035,432 | A | 3/2000 | Jeddeloh |
| 6,292,874 | B1 | 9/2001 | Barnett |
| 6,345,349 | B1 | 2/2002 | Coulson |
| 7,057,911 | B2 | 6/2006 | Klint |
| 7,058,779 | B1 | 6/2006 | McClain |
| 7,590,918 | B2 | 9/2009 | Parkinson |
| 7,600,078 | B1 | 10/2009 | Cen et al. |
| 7,756,053 | B2 | 7/2010 | Thomas et al. |
| 7,913,147 | B2 | 3/2011 | Swaminathan et al. |
| 8,176,233 | B1 | 5/2012 | Karamcheti |
| 8,462,537 | B2 | 6/2013 | Karpov et al. |
| 8,462,577 | B2 | 6/2013 | Zeng et al. |
| 8,463,948 | B1 | 6/2013 | Qawami et al. |
| 8,532,973 | B1 | 9/2013 | CaraDonna |
| 8,605,531 | B2 | 12/2013 | Kau |
| 8,607,089 | B2 | 12/2013 | Qawami et al. |
| 8,612,676 | B2 | 12/2013 | Dahlen et al. |
| 8,612,809 | B2 | 12/2013 | Casper et al. |
| 8,649,212 | B2 | 2/2014 | Kau et al. |
| 8,838,935 | B2 | 9/2014 | Hinton |
| 2002/0105523 | A1 | 8/2002 | Behrbaum et al. |
| 2002/0129212 | A1 | 9/2002 | Lee et al. |
| 2003/0033515 | A1* | 2/2003 | Autry ............................ 713/100 |
| 2005/0027933 | A1 | 2/2005 | Iyengar |
| 2005/0060526 | A1 | 3/2005 | Rothman et al. |
| 2005/0210180 | A1 | 9/2005 | Rothman et al. |
| 2005/0223157 | A1 | 10/2005 | Floman et al. |
| 2005/0251617 | A1 | 11/2005 | Sinclair et al. |
| 2005/0273584 | A1 | 12/2005 | Wisecup et al. |
| 2006/0184722 | A1 | 8/2006 | Sinclair |
| 2006/0271724 | A1 | 11/2006 | Purcell et al. |
| 2007/0005922 | A1 | 1/2007 | Swaminathan et al. |
| 2007/0101077 | A1 | 5/2007 | Evanchik et al. |
| 2007/0105267 | A1 | 5/2007 | Karpov et al. |
| 2007/0255891 | A1 | 11/2007 | Chow et al. |
| 2007/0294496 | A1 | 12/2007 | Goss et al. |
| 2008/0016269 | A1 | 1/2008 | Chow et al. |
| 2008/0034148 | A1 | 2/2008 | Gower |
| 2008/0141043 | A1* | 6/2008 | Flynn et al. ................... 713/193 |
| 2008/0168186 | A1 | 7/2008 | Gregg |
| 2008/0215828 | A1 | 9/2008 | Caulkins |
| 2008/0250189 | A1 | 10/2008 | Cheng |
| 2008/0270811 | A1 | 10/2008 | Chow et al. |
| 2009/0113198 | A1* | 4/2009 | Liu et al. ........................... 713/2 |
| 2009/0119498 | A1 | 5/2009 | Narayanan |
| 2009/0172379 | A1 | 7/2009 | Rothman et al. |
| 2009/0271562 | A1 | 10/2009 | Sinclair |
| 2009/0313416 | A1 | 12/2009 | Nation |
| 2010/0131827 | A1 | 5/2010 | Sokolov |
| 2010/0191898 | A1 | 7/2010 | Kim et al. |
| 2010/0235832 | A1 | 9/2010 | Rajagopal et al. |
| 2010/0291867 | A1 | 11/2010 | Abdulla et al. |
| 2010/0293317 | A1 | 11/2010 | Confalonieri et al. |
| 2010/0306446 | A1 | 12/2010 | Villa et al. |
| 2010/0306453 | A1 | 12/2010 | Doller |
| 2010/0315874 | A1* | 12/2010 | Ghodsi .................... 365/185.11 |
| 2010/0318718 | A1 | 12/2010 | Eilert et al. |
| 2011/0047365 | A1 | 2/2011 | Hentosh et al. |
| 2011/0063903 | A1 | 3/2011 | Kang |
| 2011/0153916 | A1 | 6/2011 | Chinnaswamy et al. |
| 2011/0197018 | A1* | 8/2011 | Noh et al. ...................... 711/103 |
| 2011/0291884 | A1 | 12/2011 | Oh et al. |
| 2012/0271985 | A1 | 10/2012 | Jeong et al. |
| 2012/0311262 | A1* | 12/2012 | Franceschini et al. ......... 711/118 |
| 2012/0324156 | A1* | 12/2012 | Muralimanohar et al. ... 711/104 |
| 2013/0282967 | A1 | 10/2013 | Ramanujan |
| 2014/0075107 | A1 | 3/2014 | Qawami et al. |

FOREIGN PATENT DOCUMENTS

| | | |
|---|---|---|
| CN | 101331465 A | 12/2008 |
| CN | 101620539 A | 1/2010 |
| EP | 0806726 A1 | 11/1997 |
| EP | 1331548 A2 | 7/2003 |
| EP | 1965297 A1 | 9/2008 |
| JP | 62191947 | 8/1987 |
| TW | 200519595 A | 6/2005 |
| TW | 1247489 B | 1/2006 |
| TW | 2008-21909 A | 5/2008 |
| TW | 200949688 A | 12/2009 |
| WO | WO 2005/002060 A2 | 1/2005 |

OTHER PUBLICATIONS

Condit et al., "Better I/O Through Byte-Addressable, Persistent Memory", SOSP '09, Oct. 11, 2009, pp. 133-146. Big Sky, Montana, USA.

Freitas et al., "Storage-class memory: The next storage system technology", IBM J. Res. & Dev., Jul./Sep. 2008, pp. 439-447, vol. 52, No. 4/5.

Akel et al, "Onyx: A Prototype Phase Change Memory Storage Array",www.flashmemorysummit.com/.../Proceeding$_{13}$ 2011/08/11$_{13}$ S301$_{13}$ Akel.pdf, 5 pgs.

Mearian, "IBM announces computer memory breakthrough Phase-change memory offers 100 times the write performance of NAND flash", Jun. 30, 2011, 3 pgs.

Caulfield et al., "Moneta: A High-performance Storage Array Architecture for Next-generation, Non-volatile Memories", MICRO 43: Proceedings of the 43rd Annual IEEE/ACM International Symposium on Microarchitecture, Atlanta, GA Dec. 2010 pp. 385-395.

"The Non-Volatile Systems Laboratory Coding for non-volatile memories", http://nvsl.ucsd.edu/ecc, printed Sep. 1, 2011. 2 pgs.

"Phase change memory-based 'moneta' system points to the future of computer storage", ScienceBlog, Jun. 2, 2011, 7 pgs.

Quereshi et al., "Scalable High Performance Main Memory System Using Phase-Change Memory Technology", ISCA '09, Jun. 20, 2009, 10 pgs., Austin, Texas, USA.

Bailey et al., "Operating System Implications of Fast, Cheap, Non-Volatile Memory" 13th USENIX, HOTOS11 2011, May 9-11, 2011, 5 pgs.

Raoux et al., "Phase-change random access memory: A scalable technology", IBM J. Res. & Dev., Jul./Sep. 2008, pp. 465-479, vol. 52, No. 4/5.

Chen et al., "Rethinking Database Algorithms for Phase Change Memory", 5th Biennial Conference on Innovative Data Systems Research (CIDR '11), Jan. 9, 2011, 11 pgs., Asilomar, California, USA.

Jacob et al., "The Memory System You Can't Avoid It, You Can't Ignore It, You Can't Fake It", 2009, 77 pgs., Morgan & Claypool.

Mogul et al., "Operating System Support for NVM+DRAM Hybrid Main Memory", 12th Workshop on Hot Topics in Operating Systems (HatOS XII), May 18, 2009, 9 pgs.

PCT Notification concerning Transmittal of International Preliminary Report on Patentability (Chapter I of the Patent Cooperation Treaty) for PCT Counterpart Application No. PCT/US2011/054421, 6 pgs., (Apr. 10, 2014).

International Search Report mailed Jun. 29, 2012 for PCT/US2011/054407, filed Sep. 30, 2011, 3 pages.

Written Opinion of the International Searching Authority mailed Jun. 29, 2012 for PCT/US2011/054407, filed Sep. 30, 2011, 3 pages.

International Preliminary Report on Patentability for International Application No. PCT/US2011/054407, dated Apr. 10, 2014, 5 pages.

"The Non-Volatile Systems Laboratory Moneta and Onyx: Very Fast SS", http://nvsl.ucsd.edu/moneta/, 3 pgs., Sep. 1, 2011.

"The Non-Volatile Systems Laboratory NV-Heaps: Fast and Safe Persistent Objects", http://nvsl.ucsd.edu/nvuheaps/, 2 pgs., Sep. 1, 2011.

Kant, Dr. Krishna, "Exploiting NVRAM for Building Multi-Level Memory Systems", International Workshop on Operating System Technologies for Large Scale NVRAM, Oct. 21, 2008, Jeju, Korea, 19 pages.

(56) References Cited

OTHER PUBLICATIONS

Edel, N.K. et al,. "MRAMFS: A Compressing File System for Nonvolatile RAM", The IEEE Computer Society's 12 Annual International Symposium on Voledam, Oct. 4, 2004, pp. 596-603.

Seungjae Baek, et al., "Design and Analysis Of A Space Conscious Nonvolatile-RAM File System", Tencon 2006, 2006 IEEE Region 10, Nov. 14, 2006, pp. 1-4.

* cited by examiner

US 9,378,133 B2

AUTONOMOUS INITIALIZATION OF NON-VOLATILE RANDOM ACCESS MEMORY IN A COMPUTER SYSTEM

CROSS-REFERENCE TO RELATED APPLICATION

This patent application is a U.S. National Phase Application under 35 U.S.C. §371 of International Application No. PCT/US2011/054407, filed Sep. 30, 2011, entitled AUTONOMOUS INITIALIZATION OF NON-VOLATILE RANDOM ACCESS MEMORY IN A COMPUTER SYSTEM.

BACKGROUND

1. Field of the Invention

Embodiments of the invention relate to a computer system; and more specifically, to an autonomous mechanism for initializing non-volatile random access memory.

2. Description of the Related Art

A. Current Memory and Storage Configurations

One of the limiting factors for computer innovation today is memory and storage technology. In conventional computer systems, system memory is typically implemented by dynamic random access memory (DRAM). DRAM-based memory consumes power even when no memory reads or writes occur because it must constantly recharge internal capacitors. DRAM-based memory is volatile, which means data stored in DRAM memory is lost once the power is removed. Further, DRAM devices are typically assembled into a Dual In-Line Memory Module (DIMM), which typically includes an Electrically Erasable Programmable Read-Only Memory (EEPROM) to store Serial Presence Detect (SPD) data. The SPD data contains information about the DIMM size, type, manufacturer, timing, and other information about the memory. The EEPROM (also referred to as "SPD EEPROM") can be accessible through a System Management Bus (SMbus).

When a computer system boots up, its Basic Input and Output System (BIOS) reads the SPD data of all of the DIMMs in the system, and, based on the SPD data, configures the memory controller to initialize the memory subsystem. The BIOS code heavily depends on the DIMM technology and the memory controller implementation. Whenever a new memory technology is introduced, a different BIOS code needs to be used or it may not work with an existing memory controller. Further, the complexity of the memory initialization is high and the access speed to the SPD data is low. Therefore, it can take several seconds to initialize the system memory.

B. Phase-Change Memory (PCM) and Related Technologies

Phase-change memory (PCM), also sometimes referred to as PCME, PRAM, PCRAM, Ovonic Unified Memory, Chalcogenide RAM and C-RAM, is a type of non-volatile computer memory which exploits the unique behavior of chalcogenide glass. As a result of heat produced by the passage of an electric current, this material can be switched between two states: crystalline and amorphous. Recent versions of PCM can achieve two additional distinct states, effectively doubling memory storage capacity. PCM is one of a number of new memory technologies competing in the non-volatile role with flash memory (also referred to as "flash"). Flash memory has a number of practical problems which these replacements hope to address.

For example, PCM can offer much higher performance in applications where writing quickly is important, in part because the memory element can be switched more quickly, and also because individual bits may be changed to either 1 or 0 without the need to first erase an entire block of cells (as is the case with flash). The high performance of PCM makes it potentially very beneficial in non-volatile memory roles that are currently performance-limited by memory access timing.

Additionally, while PCM devices degrade with use, they degrade much more slowly compared to flash. A PCM device may survive approximately 100 million write cycles. PCM lifetime is limited by mechanisms such as degradation due to GeSbTe (GST) thermal expansion during programming, metal (and other material) migration, and other mechanisms.

BRIEF DESCRIPTION OF THE DRAWINGS

The invention may best be understood by referring to the following description and accompanying drawings that are used to illustrate embodiments of the invention. In the drawings.

DETAILED DESCRIPTION

Figure 1:
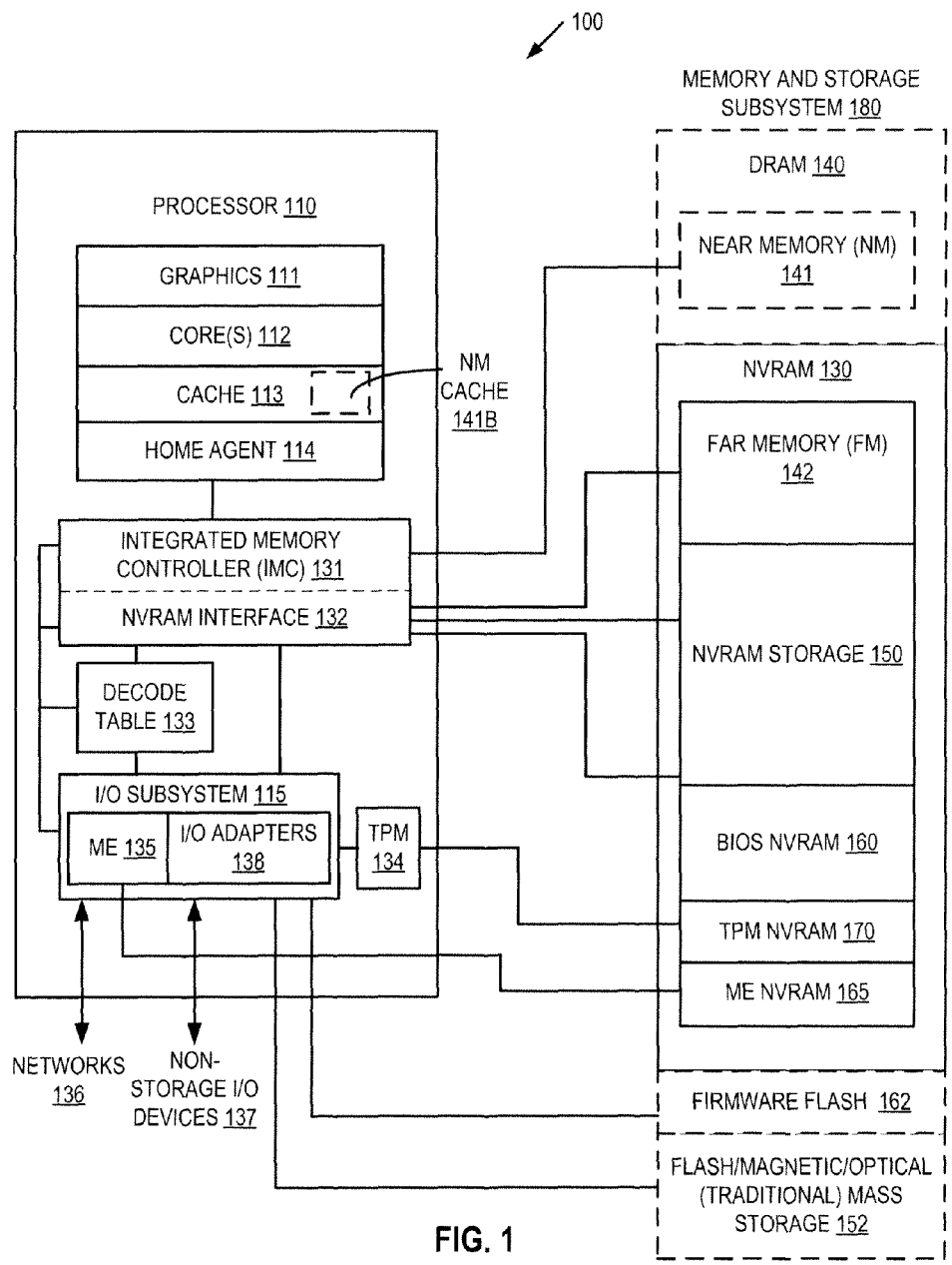
FIG. 1 illustrates a computer system that uses non-volatile memory random access (NVRAM) in one or more tiers of the platform storage hierarchy according to one embodiment of the invention.

In the following description, numerous specific details are set forth. However, it is understood that embodiments of the invention may be practiced without these specific details. In other instances, well-known circuits, structures and techniques have not been shown in detail in order not to obscure the understanding of this description.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described.

In the following description and claims, the terms "coupled" and "connected," along with their derivatives, may be used. It should be understood that these terms are not intended as synonyms for each other. "Coupled" is used to indicate that two or more elements, which may or may not be in direct physical or electrical contact with each other, co-operate or interact with each other. "Connected" is used to indicate the establishment of communication between two or more elements that are coupled with each other.

Bracketed text and blocks with dashed borders (e.g., large dashes, small dashes, dot-dash, dots) are sometimes used herein to illustrate optional operations/components that add additional features to embodiments of the invention. However, such notation should not be taken to mean that these are the only options or optional operations/components, and/or that blocks with solid borders are not optional in certain embodiments of the invention.

Embodiments of the invention described below provide an autonomous mechanism for initializing non-volatile random-access memory (NVRAM); e.g., a Phase Change Memory and Switch (PCMS). In one embodiment, a first part of the NVRAM stores a Memory interface Table (MIT), which contains information about a second part of the NVRAM (that is, the regions within the NVRAM). The MIT can be read and used by the processor to access the BIOS in the NVRAM. Since the NVRAM is non-volatile, the data in the MIT is retained across power cycles. The use of the MIT eliminates the costs associated with SPD EEPROM and enables fast initialization of NVRAM and the rest of the system. In one embodiment, if the management system of a computer system requires the SPD data of the NVRAM for out-of-band access, an NVRAM controller can create a proxy and provides the SPD data to the management system without needing an SPD EEPROM.

Further, embodiments of the invention enable the use of the NVRAM as a boot and logging device by the system. In one embodiment, some of the regions within the NVRAM stores firmware (such as BIOS code), descriptions of physical characteristics of the NVRAM, an error map, and other data and code. The NVRAM autonomous initialization (i.e., self-initialization) technique described herein does not require BIOS initialization thus enabling the NVRAM to be usable as a boot target. The use of the NVRAM for storing the BIOS also eliminates the need for a BIOS flash and other I/O attached non-volatile system boot media. By allowing a foot print larger than a conventional BIOS flash, embodiments of the invention allow for further development of system firmware that can store not only a boot sequence but also an embedded (or nested) hypervisor and platform agents. In an embodiment where backward compatibility is desired, a computer system can include an NVRAM as well as a BIOS flash for storing the BIOS boot sequence.

Embodiments of the invention also introduce NVRAM hardware (e.g., an NVRAM controller) that is responsible for performing an initialization sequence. The initialization sequence sets up the NVRAM for read access by the processor. After the NVRAM controller sets up the NVRAM for read access, the NVRAM controller can further configure the NVRAM, based on the data stored in the MIT, and report the information stored in the MIT to the processor. This will allow the processor or system hardware/firmware (e.g., an NVRAM address decoder) to map the NVRAM address range to the system address range. In one embodiment, the data stored in the MIT is configurable, which means that the size and address range of each NVRAM region can be changed according to actual need of the system.

FIG. 1 is a block diagram illustrating a computer system 100 that uses byte-addressable non-volatile random-access memory (NVRAM) 130 in one or more tiers of the platform storage hierarchy. The term "platform storage hierarchy" herein refers to the entire storage media used by computer system 100 for storing data, instructions, states, and other persistent and non-persistent information. In one embodiment, all persistent storage in the computer system 100 can coalesce into one NVRAM 130 in a configurable fashion. In addition, some portion of NVRAM 130 can be apportioned as DRAM replacement for system memory. The versatility of NVRAM 130 facilitates technology migration from a conventional platform having an operating system (OS) that operates on a persistent block-oriented file system, to an OS that understand a fully-persistent, byte-addressable, single-level data store.

In one embodiment, NVRAM 130 can be configured to implement the roles in a typical platform storage hierarchy as one or more of the following: cache, system memory (also known as main memory, primary memory, executable memory), storage (also known as secondary storage and mass storage), and firmware memory (such as boot memory (also known as BIOS Flash), Trusted Platform Module (TPM) memory, and the like). Platform storage hierarchies with different roles are also contemplated and the application of NVRAM 130 is not limited to the roles described above.

NVRAM 130 is distinguishable from other instruction and data memory/storage technologies in terms of its characteristics and/or its application in the platform storage hierarchy. For example, NVRAM 130 is different from:

1) static random access memory (SRAM) applied as a cache dedicated to a processor core or shared by multiple processor cores;
2) higher speed memory (e.g., dynamic random access memory (DRAM)) applied as one or more caches internal to the processor (e.g., on the same die as the processor) and/or external to processor (e.g., on the same or a different package from the processor);
3) flash memory/magnetic disk/optical disc applied as drive storage; and memory such as flash memory or read only memory (ROM) applied as boot ROM.

NVRAM (e.g., NVRAM 130) in one embodiment of the invention has the following characteristics:

1) non-volatile (it maintains its content even if power is removed, similar to flash memory used in solid state disks (SSD), and different from SRAM and DRAM which are volatile);
2) lower power consumption than volatile memories such as SRAM and DRAM;
3) random access (also known as randomly addressable);
4) rewritable and erasable at a lower level of granularity (e.g., byte level) than flash found in SSDs (which can only be rewritten and erased a "block" at a time—minimally 64 Kbyte in size for NOR flash and 16 Kbyte for NAND flash);
5) usable as a system memory and allocated all or a portion of the system address space;
(6) capable of being coupled to the processor over a bus using a transactional protocol (a protocol that supports transaction identifiers (IDs) to distinguish different transactions so that those transactions can complete out-of-order) and allowing access at a level of granularity small enough to support operation of the NVRAM as system memory (e.g., cache line size such as 64 or 128 byte). For example, the bus may be a memory bus (e.g., a DDR bus such as DDR3, DDR4, etc.) over which is run a transactional protocol as opposed to the non-transactional protocol that is normally used. As another example, the bus may one over which is normally run a transactional protocol (a native transactional protocol), such as a PCI express (PCIE) bus, desktop management interface (DMI) bus, or any other type of bus utilizing a transactional protocol and a small enough transaction payload size (e.g., cache line size such as 64 or 128 byte); and
6) one or more of the following:
 a) faster write speed than current non-volatile memory/storage technologies (such as flash);
 b) very high read speeds (faster than flash and near or equivalent to DRAM read speeds);

c) directly writable (rather than requiring erasing (overwriting with 1 s) before writing data like flash memory used in SSDs); and/or d) orders of magnitude (e.g., 2 or 3) higher write endurance before failure (more than boot ROM and flash used in SSDs).

As mentioned above, in contrast to flash memory, which must be rewritten and erased a complete "block" at a time, the level of granularity at which NVRAM is accessed in any given implementation may depend on the particular memory controller and the particular memory bus or other type of bus to which the NVRAM is coupled. For example, in some implementations where NVRAM 130 is used as system memory, NVRAM may be accessed at the granularity of a cache line (e.g., a 64-byte or 128-byte cache line), notwithstanding an inherent ability to be accessed at the granularity of a byte, because cache line is the level at which the memory subsystem accesses memory. Thus, when NVRAM is deployed within a memory subsystem, it may be accessed at the same level of granularity as the DRAM (e.g., the "near memory") used in the same memory subsystem. Even so, the level of granularity of access to the NVRAM by the memory controller and memory bus or other type of bus is smaller than that of the block size used by flash and the access size of the I/O subsystem's controller and bus.

NVRAM 130 may be used as instruction and data storage that has sufficiently short access time requirements to cause little impact on the processors. Here, program instructions and data may be loaded into NVRAM 130 from deeper, flash/magnetic/optical mass storage 152 prior to being executed by the processors. Moreover, as described in detail below, NVRAM 130 may be placed on a memory bus and may communicate directly with a memory controller that, in turn, communicates directly with the processors.

The presence of the new memory technology for NVRAM 130 provides for a wealth of new possibilities. Although discussed at much greater length further below, some of these possibilities are quickly highlighted immediately below.

According to one possible implementation, NVRAM 130 acts as a total replacement or supplement for traditional DRAM technology in system memory. In one embodiment, NVRAM 130 represents the introduction of a second-level system memory (e.g., system memory is as a combination of DRAM 140 and some or all of NVRAM 130). As such, the system memory may be viewed as having a near memory part NM 141A and a far memory part FM 142. It is appreciated that in different embodiments, a near memory can serve as a memory-side cache (e.g., near memory cache 141B), a scratch pad, and other roles that are different from the system memory.

According to some embodiments, NVRAM 130 provides NVRAM storage, which acts as a total replacement or supplement for traditional mass storage, e.g., flash/magnetic/optical mass storage 152. The term "traditional mass storage" in the application refers to mass storage that is based on optical, magnetic and/or flash technology, such as disk and flash memory. For simplicity of the discussion, flash/magnetic/optical mass storage 152 is also referred to as traditional mass storage 152. Thus, the non-volatile mass storage for computing system 100 may be implemented using NVRAM, flash memory, magnetic storage, or any combination thereof. In an embodiment where NVRAM storage 150 acts as a total replacement for traditional mass storage 152, it is not necessary to use storage drivers for block-addressable storage access. The removal of storage driver overhead from storage access can increase access speed and save power. In alternative embodiments where it is desired that NVRAM storage 150 appears to the OS and/or applications as block-accessible and indistinguishable from traditional mass storage 152, emulated storage drivers can be used to expose block-accessible interfaces (e.g., Universal Serial Bus (USB) Bulk-Only Transfer (BOT) 1.0, Serial Advanced Technology Attachment (SATA) 3.0, and the like) to the software for accessing NVRAM storage 150. That is, the byte addressability of NVRAM 130 can be used by the storage driver to move blocks of NVRAM storage 150 and emulate block accessible mass storage without incurring the cost of I/O interfaces in these alternative embodiments.

According to some embodiments, NVRAM 130 provides BIOS NVRAM 160 and TPM NVRAM 170, Management Engine (ME) firmware 165, and the like, which act as a total replacement or supplement for firmware memory such as firmware flash 162. Firmware memory is commonly implemented with flash technology and commonly stores the initial instructions (e.g., BIOS) executed by a processor to initialize key system components during a boot process. Firmware memory can also store system persistent states used by a TPM 134 to protect sensitive system information (e.g., encryption keys). In one embodiment, the use of NVRAM 130 for firmware memory removes the need for third party flash parts to store code and data that are critical to the system operations.

It should be understood that NVRAM 130 can include more or fewer partitions than what is shown in FIG. 1. For example, NVRAM 130 can include a partition serving as persistent memory. The persistent memory is a type of memory which is byte-addressable directly by processor and I/O for reads and writes; however, unlike volatile memory, writes to the memory are retained across platform power cycles. In some embodiments wherein flash devices or other non-volatile devices are used for storing the BIOS and/or TPM, it may be unnecessary to include BIOS NVRAM 160 and/or TPM NVRAM 170 as part of NVRAM 130.

The choice of memory and storage devices may depend on the type of platform on which the devices are used. For example, in a personal computer, tablet computer, notebook computer, mobile device (e.g., smartphone or PDA), the non-volatile mass storage may be implemented using NVRAM storage 150 alone, or using NVRAM storage 150 in combination with flash/magnetic storage. In other implementations (e.g., large-scale servers), the non-volatile mass storage may be implemented using magnetic storage (e.g., hard drives) or any combination of magnetic storage, flash, and NVRAM storage 150. In such a case, computer system hardware and/or software responsible for storage may implement various intelligent persistent storage allocation techniques to allocate blocks of persistent program code and data between the FM 142/NVRAM storage 150 and traditional mass storage 152 in an efficient or otherwise useful manner. In some embodiments, NVRAM 130 may become the sole memory/storage device off chip (i.e., off the processor chip). In some embodiments, instead of the off-chip DRAM 140, DRAM may be used to provide an on-chip cache (e.g., near memory cache 141B). These embodiments can be specifically relevant to very small platforms (e.g., smartphone or PDA), where multiple memory classes/technologies may be cost prohibitive and more transistors (including storage) can be placed on chip.

The NVRAM 130 may incorporate "wear leveling" algorithms to account for the fact that the storage cells at the far memory level begin to wear out after too many write accesses. Since high cycle count blocks are most likely to wear out in this manner, wear leveling spreads writes across the far memory cells by swapping addresses of high cycle count blocks with low cycle count blocks. Note that most address swapping is typically transparent to the end user because it is handled by hardware, software (e.g., a low level driver or operating system), or a combination of the.

In one embodiment, NVRAM 130 can be implemented with a non-volatile random access memory such as PCM or, more specifically, PCMS (also known as (PRAM or PCRAM), Ovonic Unified Memory (OUM), (CRAM). Other possible technology choices for far memory include, but are not limited to byte-addressable persistent memory (BPRAM), storage class memory (SCM), universal memory, Ge2Sb2Te5, Programmable metallization cell (PMC), Resistive memory (RRAM), RESET (amorphous) cell, SET (crystalline) cell, PCME, Ovshinsky, ferroelectric memory (also known as polymer memory and poly(N-vinylcarbazole)), ferromagnetic memory (also known as Spintronics, SPRAM (spin-transfer torque RAM), SPRAM (spin tunneling RAM), Magnetoresistive, Magnetic memory, and Magnetic random access memory (MRAM)), and Semiconductor-oxide-nitride-oxide-semiconductor (SONOS, also know dielectric memory).

For convenience of explanation, most of the remainder of the application will sometimes refer to "PCM" or "PCMS" as the technology selection for NVRAM 130. As such, the terms NVRAM, PCM and PCMS may be used interchangeably in the following discussion. However it should be realized, as discussed above, that different technologies may also be utilized for NVRAM 130.

Continuing then with a discussion of the system of FIG. 1, in some embodiments, the architecture of computer system 100 may include multiple processors, although a single processor 110 is illustrated in FIG. 1 for simplicity. Processor 110 may be any type of data processor including a general purpose or special purpose central processing unit (CPU), an application-specific integrated circuit (ASIC) or a digital signal processor (DSP). For example, processor 110 may be a general-purpose processor, such as a Core™ i3, i5, i7, 2 Duo and Quad, Xeon™, or Itanium™ processor, all of which are available from Intel Corporation, of Santa Clara, Calif. Alternatively, processor 110 may be from another company, such as ARM Holdings, Ltd, of Sunnyvale, Calif., MIPS Technologies of Sunnyvale, Calif., etc. Processor 110 may be a special-purpose processor, such as, for example, a network or communication processor, compression engine, graphics processor, co-processor, embedded processor, or the like. Processor 110 may be implemented on one or more chips included within one or more packages. Processor 110 may be a part of and/or may be implemented on one or more substrates using any of a number of process technologies, such as, for example, BiCMOS, CMOS, or NMOS.

In one embodiment, the processor 110 includes an integrated graphics unit 111 which includes logic for executing graphics commands such as 3D or 2D graphics commands. While the embodiments of the invention are not limited to any particular integrated graphics unit 111, in one embodiment, the graphics unit 111 is capable of executing industry standard graphics commands such as those specified by the Open GL and/or Direct X application programming interfaces (APIs) (e.g., OpenGL 4.1 and Direct X 11).

The processor 110 may also include one or more cores 112, although a single core 112 is illustrated in FIG. 1, again, for the sake of clarity. In many embodiments, core 112 includes internal functional blocks such as one or more execution units, retirement units, a set of general purpose and specific registers, etc. If core 112 is multi-threaded or hyper-threaded, then each hardware thread may be considered as a "logical" core as well. The cores 112 may be homogenous or heterogeneous in terms of architecture and/or instruction set. For example, some of the cores may be in order while others are out-of-order. As another example, two or more of the cores may be capable of executing the same instruction set, while others may be capable of executing only a subset of that instruction set or a different instruction set.

The processor 110 may also include one or more caches, such as cache 113 which may be implemented as a SRAM and/or a DRAM. In many embodiments that are not shown, additional caches other than cache 113 are implemented so that multiple levels of cache exist between the execution units in the core(s) 112 and memory devices 141A and 142. For example, the set of shared cache units may include an upper-level cache, such as a level 1 (L1) cache, mid-level caches, such as level 2 (L2), level 3 (L3), level 4 (L4), or other levels of cache, a last level cache (LLC), and/or different combinations thereof. In different embodiments, cache 113 may be apportioned in different ways and may be one of many different sizes in different embodiments. For example, cache 113 may be an 8 megabyte (MB) cache, a 16 MB cache, etc. Additionally, in different embodiments the cache may be a direct mapped cache, a fully associative cache, a multi-way set-associative cache, or a cache with another type of mapping. In other embodiments that include multiple cores, cache 113 may include one large portion shared among all cores or may be divided into several separately functional slices (e.g., one slice for each core). Cache 113 may also include one portion shared among all cores and several other portions that are separate functional slices per core. In one embodiment, cache 113 may include a DRAM near memory cache 141B.

The processor 110 may also include a home agent 114 which includes those components coordinating and operating core(s) 112. The home agent unit 114 may include, for example, a power control unit (PCU) and a display unit. The PCU may be or include logic and components needed for regulating the power state of the core(s) 112 and the integrated graphics unit 111. The display unit is for driving one or more externally connected displays.

In some embodiments, processor 110 includes an integrated memory controller (IMC) 131 to provide an interface for communicating with a memory and storage subsystem 180. More specifically, in one embodiment, IMC 131 contains logic necessary for reading from, writing to and refreshing DRAM device 140. IMC 131 can be on the same chip as processor 110, or on a separate chip and/or package connected to processor 110.

In some embodiments, processor 110 includes an I/O subsystem 115 coupled to IMC 131. I/O subsystem 115 enables communication between processor 110 and the following serial or parallel I/O devices: one or more networks 136 (such as a Local Area Network, Wide Area Network or the Internet), storage I/O device (such as traditional mass storage 152, firmware flash 162, and the like) and one or more non-storage I/O devices 137 (such as display, keyboard, speaker, and the like). I/O subsystem 115 may include a platform controller hub (PCH) (not shown) that further includes several I/O adapters 138 and other I/O circuitry to provide access to the storage and non-storage I/O devices and networks. To accomplish this, I/O subsystem 115 may have at least one integrated I/O adapter 138 for each I/O protocol utilized. I/O subsystem 115 can be on the same chip as processor 110, or on a separate chip and/or package connected to processor 110.

I/O adapters 138 translate a host communication protocol utilized within the processor 110 to a protocol compatible with particular I/O devices. For traditional mass storage 152, some of the protocols that I/O adapters 138 may translate include Peripheral Component Interconnect (PCI)-Express 3.0, Universal Serial Bus (USB) 3.0, Serial Advanced Technology Attachment (SATA) 3.0, Small Computer System Interface (SCSI), Redundant Array of Inexpensive Disks (RAID) and 1394 "Firewire," among others. For firmware flash 162, some of the protocols that I/O adapters 138 may translate include Serial Peripheral Interface (SPI), Microwire, among others. Additionally, there may be one or more wireless protocol I/O adapters. Examples of wireless protocols are Bluetooth 4.0, IEEE 802.11-based wireless protocols, and cellular protocols, among others.

In some embodiments, I/O subsystem 115 also includes a Management Engine (ME) 135, which is a microprocessor (equivalently, a micro-controller) that allows a system administrator to monitor, maintain, update, upgrade, and repair computer system 100. In one embodiment, a system administrator can remotely configure computer system 100 through ME 135 via networks 136. In one embodiment, the configuration can be stored in a decode table 133 within processor 110. Decode table 133 can be read by IMC 131 and I/O subsystem 115, which then decide where a data access request should be directed.

In some embodiments, processor 110 includes a Trusted Platform Module (TPM) 134 to control access to system persistent states, such as secure data, encryption keys, platform configuration information and the like. In one embodiment, these system persistent states are stored in a TPM NVRAM 170, which can be implemented with PCM-based memory such as PCMS. In the embodiment shown in FIG. 1, TPM NVRAM 170 is part of NVRAM 130.

In one embodiment, TPM 134 is a secure micro-controller with cryptographic functionalities. TPM 134 has a number of trust-related capabilities; e.g., a "seal" capability for ensuring that data protected by a TPM is only available for the same TPM. TPM 134 can protect data and keys (e.g., secrets) using its encryption capabilities. In one embodiment, TPM 134 has a unique and secret RSA key (which is generated based on the RSA algorithm developed by Ron Rivest, Adi Shamir and Leonard Adleman), which allows it to authenticate hardware devices and platforms. For example, TPM 134 can verify that a system seeking access to data stored in computer system 100 is the expected system. TPM 134 is also capable of reporting the integrity of the platform (e.g., computer system 100). This allows an external resource (e.g., a server on a network) to determine the trustworthiness of the platform but does not prevent access to the platform by the user. In one embodiment, TPM 134 includes an NVRAM interface to communicate with NVRAM 130.

In the embodiment of FIG. 1, ME 135 and TPM 134 are part of processor 110 in a system-on-a-chip (SOC) configuration. The SOC configuration is suitable for mobile platforms and other portable systems. In alternative embodiments, ME 135 and TPM 134 can be on one or more chipsets outside of but coupled to processor 110. These alternative embodiments can be suitable for server platforms.

It should be understood that a computer system can utilize NVRAM 130 for system memory, mass storage, firmware memory and/or other memory and storage purposes even though its processor does not have all of the above-described components of processor 110, or has more components than processor 110.

In one embodiment, computer system 100 includes a NVRAM interface 132 to control data access to NVRAM 130. NVRAM interface 132 is coupled to IMC 131 and I/O subsystem 115. NVRAM interface 132 can read the configuration data from decode table 133, or alternatively, can rely on the decoding results passed from IMC 131 and I/O subsystem 115. In an embodiment where NVRAM 130 is implemented with PCMS, NVRAM interface 132 is a PCMS interface that performs byte-level access with protocols consistent with the PCMS technology. Although IMC 131 and NVRAM interface 132 can be two discrete parts (as shown in FIG. 1 with a dotted line separating the two parts), in some embodiments IMC 131 and NVRAM interface 132 can be implemented as one combined controller to control the access to memory and storage.

In FIG. 1, NVRAM interface 132 is shown connected to FM 142, NVRAM mass storage 150 and BIOS NVRAM 160 using three separate lines. This does not necessarily mean, however, that there are three separate physical buses or communication channels connecting NVRAM interface 132 to these portions of the NVRAM 130. Rather, in some embodiments, a common memory bus or other type of bus is used to communicatively couple the NVRAM interface 132 to the FM 142, NVRAM mass storage 150, and BIOS NVRAM 160. For example, in one embodiment, the three lines in FIG. 1 represent a bus, such as a memory bus (e.g., a DDR3, DDR4, etc.) over which NVRAM interface 132 implements a transactional protocol to communicate with NVRAM 130. NVRAM interface 132 may also communicate with NVRAM 130 over a bus supporting a native transactional protocol such as a PCI express (PCI-E) bus, desktop management interface (DMI) bus, or any other type of bus utilizing a transactional protocol.

In some embodiment, NVRAM 130 can be coupled to processor 510 via a high-speed link that follows the same protocol as the inter-processor protocol (e.g., HyperTransport 3.0, Quick-Path Interconnect (QPI) 1.1 and its variants, and the like). In these embodiments, NVRAM interface 132 can communicate with NVRAM 130 using the protocols defined for these high-speed links.

Figure 2:
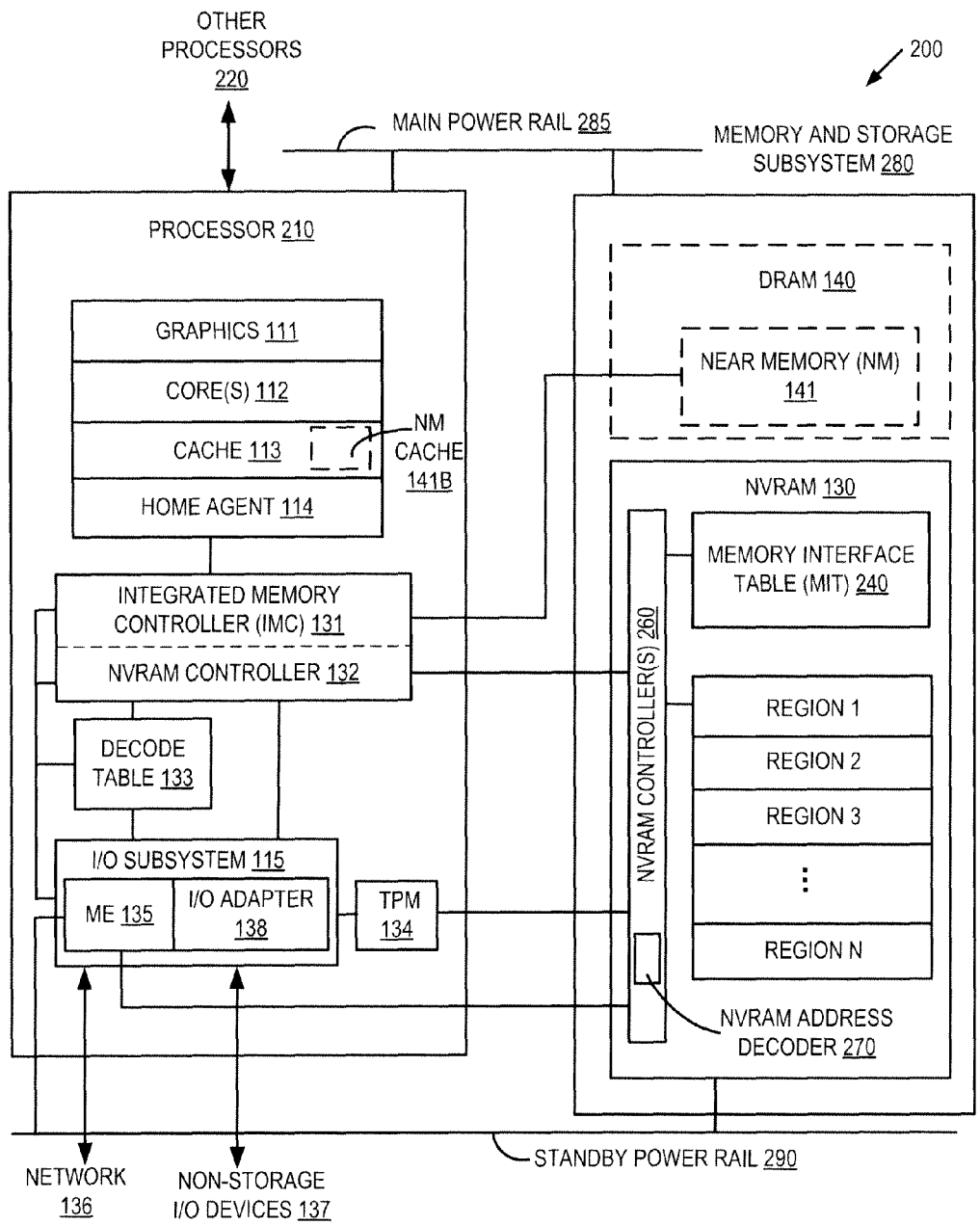
FIG. 2 illustrates a computer system that supports autonomous initialization of the NVRAM according to one embodiment of the invention.

FIG. 2 is a block diagram illustrating a computer system 200 that incorporates NVRAM 130 into a memory and storage subsystem 280 according to one embodiment of the invention. In this embodiment, NVRAM 130 has configurable partitions (NVRAM regions 230), which can be used as system memory, mass storage, firmware storage (e.g., BIOS storage), and other data storage. Computer system 200 includes a processor 210 coupled to one or more other processors 220. Processor 210 can be the same as processor 110 of FIG. 1, except that I/O adaptors 238 do not necessarily include all of adaptors 138 of FIG. 1 for accessing traditional mass storage and flash memory. In the embodiment of FIG. 2, computer system hardware and/or software responsible for memory and storage access may implement various intelligent techniques to benefit from the low-latency, high-throughput and robustness of NVRAM 130 (as compared to the traditional flash/magnetic/optical storage, such as mass storage 152 and firmware flash 162).

In one embodiment, NVRAM 130 stores a memory interface table (MIT) 240. MIT 240 contains information of NVRAM 130 that allows NVRAM 130 to be autonomously initialized at system power-on. The detailed content of MIT 240 is described later in greater detail with reference to FIG. 3.

In one embodiment, NVRAM 130 is partitioned into a number of regions to store data that can be used at system power-on (e.g., initialization data and BIOS) and during normal operation of the system (e.g., system memory and persistent data storage). In one embodiment, NVRAM 130 also includes an NVRAM controller 260 that can set up NVRAM 130 for access by processor 210. NVRAM controller 260 further includes an NVRAM address decoder 270 to convert addresses between the system address space (used by processor 210) and the NVRAM address space.

In one embodiment, NVRAM 130 is accessible by ME 135. In the embodiment of FIG. 2, ME 135 is an integrated microprocessor (equivalently, a micro-controller) that can be powered-on independently of processor 210. In one embodiment, a main power rail 285 supplies power to processor 210, ME 135 and memory and storage subsystem 280. Additionally, ME 135 and NVRAM 130 receive an independent source of power from a standby power rail 290. When main power rail 285 fails or otherwise does not provide power, ME 135 can receive power from standby power rail 290 and access ME firmware 165 (FIG. 1) in NVRAM 130 to become fully operational independent of the power status of processor 210 and the rest of the platform.

In an alternative embodiment, NVRAM 130 can be accessible by a micro-controller (e.g., TPM 134 of FIG. 1) other than ME 135. This micro-controller is coupled to standby power rail 290 and can be powered-on independently of processor 210. When main power rail 285 fails or otherwise does not provide power, this micro-controller can receive power from standby power rail 290 and access the associated firmware (e.g., TPM firmware 170) in NVRAM 130 to become fully operational. This micro-controller can be part of processor 210, can be on a chipset outside of but coupled to processor 210, can be part of I/O subsystem 115, or can be outside of I/O subsystem 115. With this micro-controller or ME 135, computer system 200 or at least part of computer system 200 can still be functional (using the firmware in NVRAM 130) even when main power rail 285 fails to provide power.

Figure 3:
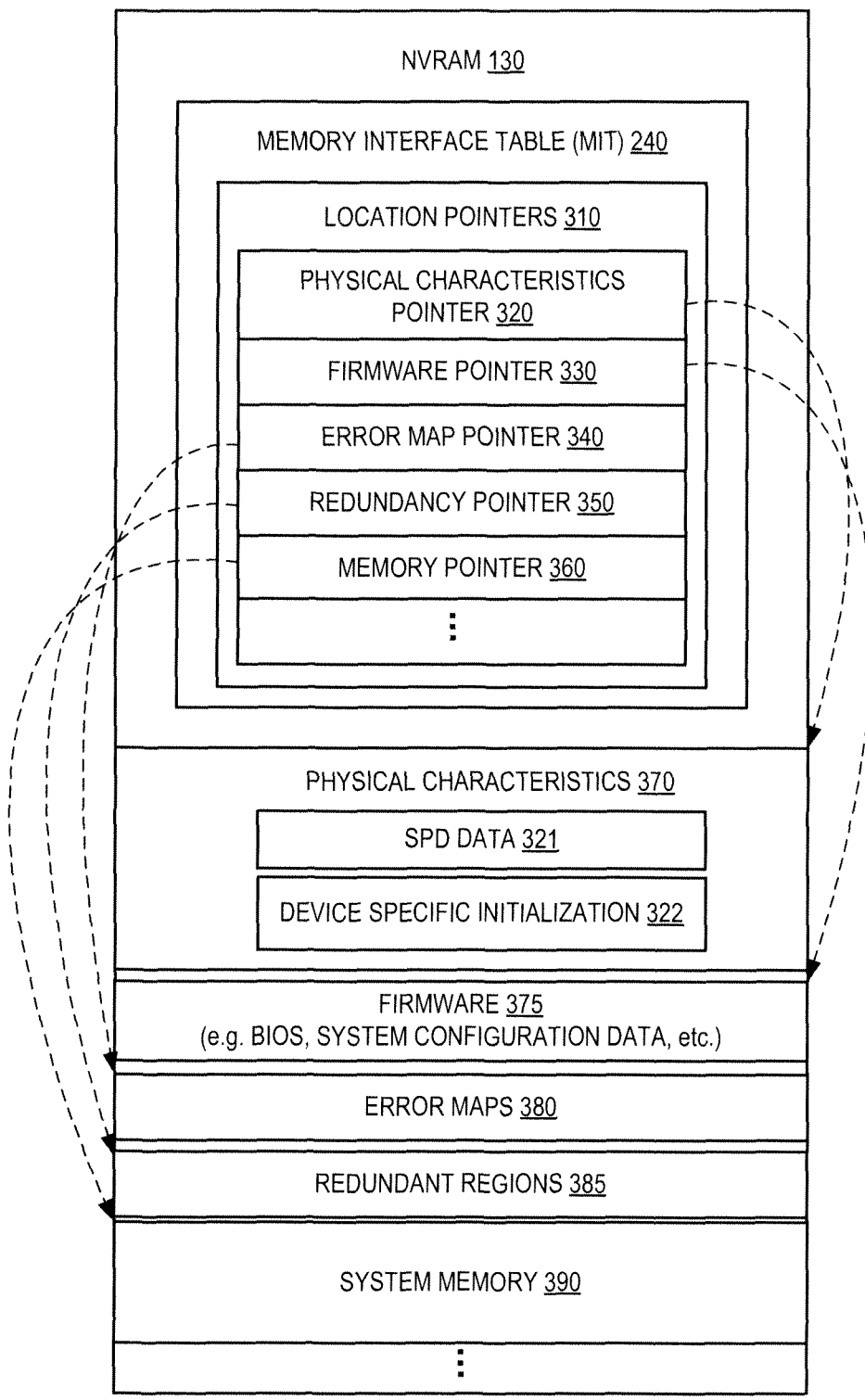
FIG. 3 illustrates an example of a memory interface table (MIT) stored in the NVRAM according to one embodiment of the invention.

FIG. 3 is a block diagram illustrating an example of the data stored in NVRAM 130 according to one embodiment of the invention. NVRAM 130 includes MIT 240 and a number of regions. MIT 240 stores location pointers 310, with each location pointer 310 pointing to one of the regions. The regions include, but are not limited to: a physical characteristics region 370 (which stores Serial Presence Detect (SPD) data 321, device-specific initialization sequences 322, and other initialization data); a firmware region 375 to store the BIOS, system configuration data, an embedded hypervisor, embedded platform agents and other firmware and software; error maps 380 to store the error locations of NVRAM 130 for error isolation and recovery; redundant regions 385 to store redundant blocks of NVRAM 130 for use in error recovery, a system memory region 390 for use as the system memory of the computer system. Additional regions, such as mass storage region, TPM region, persistent memory region, error logs, and the like, can also be included in the NVRAM 130. Correspondingly, location pointers 310 include a physical characteristics pointer 320, a firmware pointer 330, an error map pointer 340, a redundancy pointer 350 and a memory pointer 360. Additional pointers can also be included for pointing to additional regions. Each of the pointers 320-360 points to a corresponding region. In one embodiment, each pointer 320-360 stores information of a starting address and length of the corresponding region. The dotted arrows in FIG. 3 show the relationship between a pointer and its corresponding region.

As described above, the NVRAM regions store information such as error maps 380 and redundant regions 385 that can be used for error recovery. For example, NVRAM 130 may contain corrupted data in any of its regions and/or MIT 240. The corruption can prevent access to data vital to self-initialization of the system. In order to work around this issue, NVRAM 130 maintains error maps 380 of known bad locations and redundant regions 385 containing copies of vital data such as MIT 240, system configuration data, and the like. NVRAM controller 260 can identify corrupted areas of NVRAM 130 using error maps 380 and reconfigure NVRAM 130 utilizing redundant regions 385 to exclude the corrupted areas from use.

In one embodiment, NVRAM 130 includes one or more NVRAM controllers 260. NVRAM 130 maintains vital system configuration data (e.g., as part of the system configuration data stored in firmware region 375) relating to how NVRAM controller 260 (or NVRAM controllers 260) and NVRAM 130 are connected to the system. The vital system configuration data allows computer system 200 to be configured to its state prior to a power cycle of the system (which would otherwise cause system to lose such configuration information). Examples of the vital system configuration data include, but are not limited to: NVRAM controller identification data, interleave information across NVRAM controllers 260, locations of NVRAM controllers 260 and DIMMs relative to the system topology, etc.

In an embodiment where NVRAM 130 includes multiple NVRAM controllers 260, one of the multiple NVRAM controllers 260 operates as a boot agent. In such an environment, processor 210 needs to know which NVRAM controller 260 is the target for boot. This can be accomplished by a hardware protocol that allows the platform to query all of NVRAM controllers 260. The one NVRAM controller 260 that is boot-capable will respond to the query, advertising its capability as a boot agent.

In one embodiment, MIT 240 is read during an autonomous initialization process of NVRAM 130 at boot time. After NVRAM 130 is initialized, the BIOS stored in NVRAM 130 can be accessed by processor 210 to execute BIOS code, such as pre-EFI (Pre-Extensible Firmware Interface, also known as PEI) BIOS code. The PEI BIOS code is responsible for the initial system configuration, such as the initialization of processor, chipset, processor and chipset interconnects (e.g., HyperTransport 3.0, Quick-Path Interconnect (QPI) 1.1, as well as memory and storage subsystems). The PEI BIOS code is also responsible for interleaving memory and handing off to the higher-level BIOS modules called Driver Execution Environment (DXE), as defined in the Unified EFI (UEFI) standard (e.g., UEFI specification version 2.3.1).

It should be understood that the use of MIT 240 for autonomous initialization of NVRAM 130 is independent of the configuration of memory and storage subsystem 280. More specifically, NVRAM 130 can store MIT 240 and the corresponding regions regardless whether memory and storage subsystem 280 includes DRAM 140 or additional memory devices, such as block-addressable non-volatile devices (e.g., flash/magnetic/optical storage device). In the following description, these alternative embodiments of computer system 200 are collectively referred to as the "variants of computer system 200."

Figure 4:
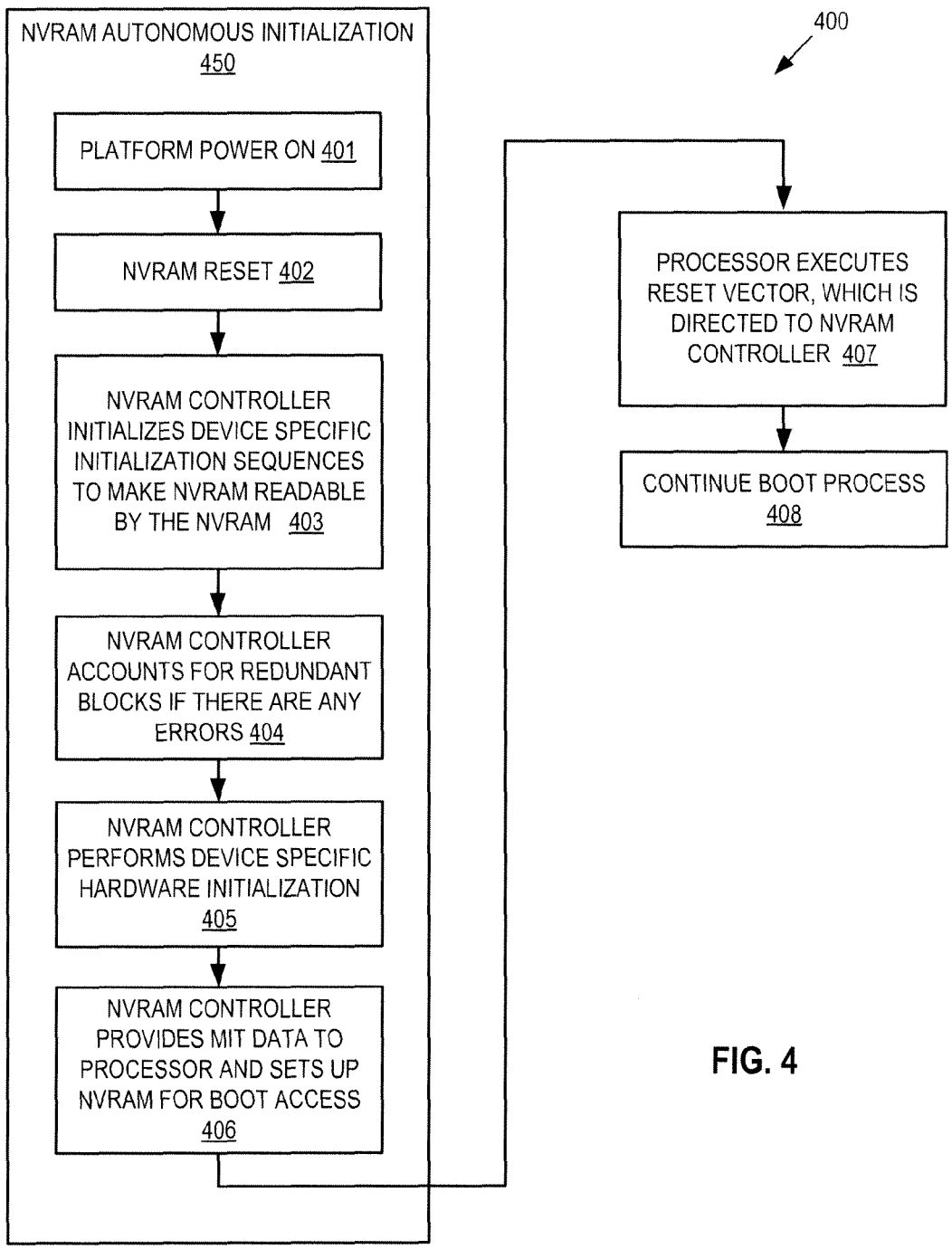
FIG. 4 illustrates a method of autonomously initializing the NVRAM according to one embodiment of the invention.

FIG. 4 is a flow diagram illustrating a method 400 of autonomous initialization of NVRAM 130 according to one embodiment of the invention. Method 400 can be executed by computer system 200 or its variants as previously defined. For simplicity of the description, the operations of the flow diagram of FIG. 4 will be described with reference to the embodiment of FIG. 2. However, it should be understood that the operations of the flow diagram can be performed by the embodiment of FIG. 2, as well as embodiments other than those shown in these figures. Additionally, the embodiments discussed with reference to FIG. 2 can perform different operations than those discussed with reference to the flow diagram of FIG. 4.

In one embodiment, NVRAM 130 starts an autonomous initialization process at system power-on (block 450). When computer system 200 is powered on (block 401), a power-on reset signal is generated to reset processor 210 as well as NVRAM 130 (block 402). Referring also to FIG. 3, NVRAM controller 260 initializes device-specific initialization sequences 322 to make NVRAM 130 (in particular, MIT 240) readable by the NVRAM controller 260 (block 403), such that MIT 240 can be read by NVRAM controller 260 in a device agnostic manner. (Here, "device agnostic manner" means that NVRAM controller 260 does not need additional information regarding what kind of NVRAM it is trying to read as long as NVRAM controller 260 has access to device-specific initialization sequences 322. If there are any errors in NVRAM 130 (as indicated by error maps 380), NVRAM controller 260 accounts for these errors by replacing error blocks with redundant blocks in redundant region 385 (block 404). NVRAM controller 260 then performs device-specific hardware initialization to initialize NVRAM 130 (block 405). This hardware initialization allows the entire NVRAM 130 behind NVRAM controller 260 to be accessible in a power and performance optimized mode. NVRAM controller 260 then provides the MIT 240 data to processor 210 and sets up NVRAM 130 for processor 210 access (block 406). At this point, NVRAM address decoder 270 is also set up to convert addresses in the system address space to addresses in the NVRAM address space. The initialization operations described above in blocks 401-406 is autonomous, which means that NVRAM 130 is initialized without any interactions or any help from processor 210, firmware, or logic circuits outside of NVRAM 130. Processor 210, firmware, or logic circuits outside of NVRAM 130 does not need to run prior to the autonomous initialization of NVRAM 130. The autonomous initialization is performed before the BIOS is accessed and run for platform boot. In an embodiment where the BIOS is stored in NVRAM 130, the BIOS is accessible only after the NVRAM 130 is initialized according to the operations described above in blocks 401-406.

Subsequently, processor 210 executes a power-on reset vector, which is directed to NVRAM controller 260 (block 407). As NVRAM 130 has already been set up for processor access, processor 210 can fetch the BIOS in NVRAM 130 and execute the BIOS to boot up the rest of computer system 200. Processor 210 then continues the boot process from this point (block 408); e.g., by initializing the other processors 220, DRAM 140, I/O devices (e.g., I/O devices 137 and other I/O interfaces, if any), and booting up the OS.

The techniques shown in the flow diagram of FIG. 4 can be implemented using instructions and data stored on non-transitory machine-readable or computer-readable media, such as non-transitory machine-readable or computer-readable storage media (e.g., magnetic disks; optical disks; random access memory; read-only memory; flash memory devices; and phase-change memory).

Embodiments of the invention may also be provided as a computer program product which may include a non-transitory machine-readable medium having stored thereon instructions which may be used to program a computer (or other electronic device) to perform a process. The non-transitory machine-readable medium may include, but is not limited to, floppy diskettes, optical disks, CD-ROMs, and magneto-optical disks, ROMs, RAMs, EPROMs, EEPROMs, magnet or optical cards, propagation media or other type of media/machine-readable medium suitable for storing electronic instructions. Embodiments of the invention may also be downloaded as a computer program product, wherein the program may be transferred from a remote computer (e.g., a server) to a requesting computer (e.g., a client) by way of data signals embodied in a carrier wave or other propagation medium via a communication link (e.g., a modem or network connection).

While the invention has been described in terms of several embodiments, those skilled in the art will recognize that the invention is not limited to the embodiments described, can be practiced with modification and alteration within the spirit and scope of the appended claims. The description is thus to be regarded as illustrative instead of limiting.

What is claimed is:

1. An apparatus comprising:
a non-volatile random access memory (NVRAM) controller having a first interface to communicatively couple to a processor, the NVRAM controller having a second interface to communicatively couple to an NVRAM, the NVRAM being byte-rewritable and byte-erasable by the processor so that the NVRAM behaves as a system memory, the NVRAM to store thereon a memory interface table containing information for the NVRAM controller to autonomously initialize the NVRAM upon power-on of a computer system without interacting with the processor and firmware outside of the NVRAM, to thereby allow access to the NVRAM by the computer system, the memory interface table to contain a pointer to BIOS program code that is stored in the NVRAM, the apparatus further comprising a plurality of NVRAM controllers to manage the NVRAM, each of the NVRAM controllers to manage a respective portion of the NVRAM and wherein one of the NVRAM controllers is a boot agent to autonomously initialize the NVRAM, wherein the boot agent is to respond to a query from the computer system to identify itself as the boot agent.

2. The apparatus of claim 1, wherein, after autonomous initialization of the NVRAM, the NVRAM controller is to provide the processor with the pointer in the memory interface table to allow the processor to access the BIOS program code and to thereby boot up the computer system.

3. The apparatus of claim 1, further comprising:
a micro-controller coupled to the processor;
a main power rail to supply power to the processor; and
a standby power rail to support standby power to the micro-controller,
wherein the micro-controller is to use information in the memory interface table to access microcontroller firmware in the NVRAM when the main power rail does not supply power to the computer system.

4. The apparatus of claim 3, wherein the micro-controller is a Management Engine (ME).

5. The apparatus of claim 1, wherein the NVRAM comprises phase change memory (PCM).

6. The apparatus of claim 1, wherein the NVRAM contains a plurality of regions and the memory interface table is to contain a plurality of location pointers, with each of the location pointers pointing to one of the regions.

7. The apparatus of claim 6, wherein the plurality of regions comprises one or more of the following: Serial Presence Detect (SPD) data, device-specific initialization sequences, system configuration data, error maps and redundant regions.

8. The apparatus of claim 1, wherein the NVRAM has stored thereon error maps, wherein the NVRAM controller is to identify corrupted areas of the NVRAM using the error maps and to reconfigure the NVRAM using redundant regions in the NVRAM to exclude the corrupted areas from use.

9. The apparatus of claim 1,
wherein the NVRAM has stored thereon system configuration data, which describes how the plurality of NVRAM controllers and the NVRAM are connected to the computer system.

10. A method comprising:
receiving a power-on signal in a computer system, the computer system comprising a processor and a non-volatile random access memory (NVRAM) that is byte-rewritable and byte-erasable by the processor;
reading, by an NVRAM controller coupled to the NVRAM, a memory interface table in the NVRAM;
autonomously initializing, by the NVRAM controller, the NVRAM using information in the memory interface table upon power-on of the computer system without interacting with the processor and firmware outside of the NVRAM, the information being a pointer to BIOS program code within NVRAM;
providing the information to the processor to allow the processor to access the BIOS program code within the NVRAM to boot up the computer system;
accessing the NVRAM by the processor where the processor views the NVRAM as a system memory;
wherein the NVRAM comprises a plurality of NVRAM controllers including the NVRAM controller, with each controller managing a portion of the NVRAM, the method further comprising:
receiving, by the plurality of NVRAM controllers, a query from the computer system for a boot agent; and,
in response to the query, one of the plurality of the NVRAM controllers identifying itself as the boot agent.

11. The method of claim 10, further comprising:
after autonomous initialization of the NVRAM, providing by the NVRAM controller to the processor the pointer in the memory interface table to allow the processor to access the BIOS and to thereby boot up the computer system.

12. The method of claim 10, wherein the computer system comprises: a micro-controller coupled to the processor, a main power rail to supply power to the processor, and a standby power rail to support standby power to the micro-controller, the method further comprising:
providing the information to the micro-controller to allow the micro-controller to:
access micro-controller firmware stored in the NVRAM when the main power rail does not supply power to the computer system.

13. The method of claim 10, wherein the NVRAM comprises phase change memory (PCM).

14. The method of claim 10, wherein the NVRAM contains a plurality of regions and wherein reading the memory interface table in the NVRAM further comprises:
locating one of a plurality of location pointers in the memory interface table; and
locating a corresponding one of the regions by following the one of the location pointers,
wherein the plurality of regions comprises one or more of the following: Serial Presence Detect (SPD) data, device-specific initialization sequences, system configuration data, error maps and redundant regions.

15. The method of claim 10, wherein the NVRAM has stored thereon error maps and redundant regions, the method further comprising:
identifying corrupted areas of the NVRAM using the error maps; and
reconfiguring the NVRAM using the redundant regions to exclude the corrupted areas from use.

16. A system comprising:
a processor in a computer system;
a main power rail coupled to the processor;
a standby power rail;
a non-volatile random access memory (NVRAM) controller coupled to the processor; and
an NVRAM coupled to the controller and coupled to both the main power rail and the standby power rail, the NVRAM being byte-rewritable and byte-erasable by the processor so that the NVRAM behaves as a system memory, the NVRAM having stored thereon a memory interface table containing information for the NVRAM controller to autonomously initialize the NVRAM when either the main power rail or the standby power rail turns on power without interacting with the processor and firmware outside of the NVRAM, to thereby allow access to the NVRAM by the computer system, the memory interface table to contain a pointer to BIOS program code that is stored in the NVRAM, the system further comprising a plurality of NVRAM controllers to manage the NVRAM, each of the NVRAM controllers to manage a respective portion of the NVRAM and wherein one of the NVRAM controllers is a boot agent to autonomously initialize the NVRAM, wherein the boot agent is to respond to a query from the computer system to identify itself as the boot agent.

17. The system of claim 16, wherein, after autonomous initialization of the NVRAM, the NVRAM controller is to provide the processor with the pointer in the memory interface table to allow the processor to access the BIOS program code and to thereby boot up the computer system.

18. The system of claim 16, further comprising:
a micro-controller coupled to the processor and the standby power rail,
wherein the micro-controller uses information in the memory interface table to access microcontroller firmware in the NVRAM when the main power rail does not supply power to the computer system.

19. The system of claim 16, wherein the NVRAM comprises phase change memory (PCM).

20. The system of claim 16, wherein the NVRAM contains a plurality of regions and the memory interface table is to contain a plurality of location pointers, with each of the location pointers pointing to one of the regions, wherein the plurality of regions comprises one or more of the following: Serial Presence Detect (SPD) data, device-specific initialization sequences, system configuration data, error maps and redundant regions.

21. The system of claim 16, wherein the NVRAM has stored thereon error maps, wherein the NVRAM controller is to identify corrupted areas of the NVRAM using the error maps and to reconfigure the NVRAM using redundant regions in the NVRAM to exclude the corrupted areas from use.

* * * * *